(No Model.)
M. M. PEARSON.
COTTON GIN.
No. 551,784. Patented Dec. 24, 1895.
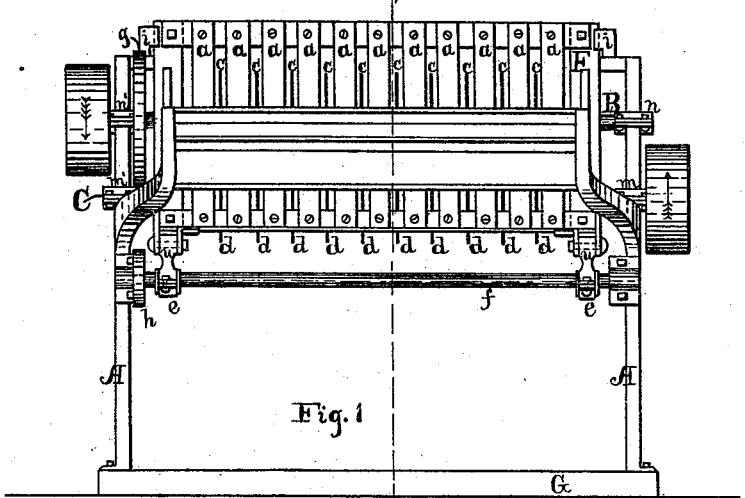
Fig. 1
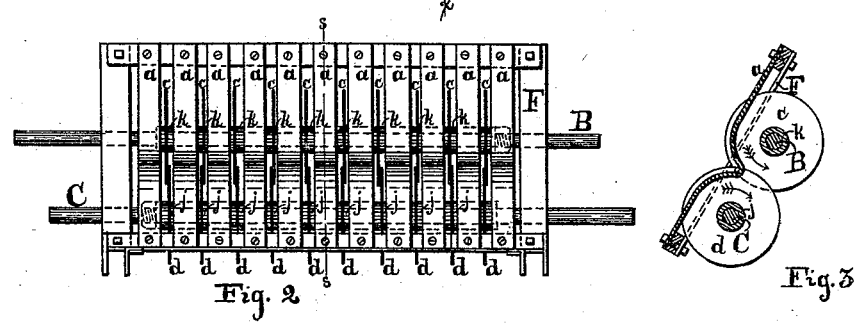
Fig. 2
Fig. 3
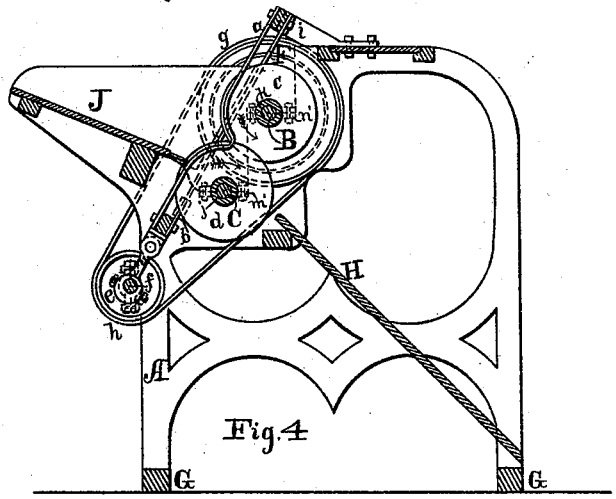
Fig. 4
Witnesses:
Ivor L. Brind
Thomas H. Laird
Inventor:
Millard Milton Pearson

United States Patent Office.

MILLARD MILTON PEARSON, OF SAVANNAH, GEORGIA.

COTTON-GIN.

SPECIFICATION forming part of Letters Patent No. 551,784, dated December 24, 1895.

Application filed March 9, 1895. Serial No. 541,156. (No model.)

*To all whom it may concern:*

Be it known that I, MILLARD MILTON PEARSON, a citizen of the United States, residing at Savannah, in the county of Chatham and State of Georgia, have invented certain new and useful Improvements in Cotton-Gins; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to cotton-gins, and the object is to produce a simple, cheap, and durable machine, capable of separating seed and lint at a more rapid rate than is customary by apparatus designed for this purpose as ordinarily constructed, without cutting the staple of the cotton, no saws or blades being used. Greater regularity in the operation is also effected by the use of my device.

My invention consists essentially of two series of flexible and elastic disks, fixed at suitable and commonly equal distances apart upon parallel shafts adapted to rotate toward each other. The sets of disks borne upon the shafts are placed with a portion of one side of each disk in contact with a similar section of a disk upon the other shaft, contact between the disks being maintained by their elasticity. Each couple of meeting disks is included between two ribs formed with curving bends near the middle and attached to a frame having a reciprocating motion hereinafter more particularly described.

The advantages secured by the use in roller-gins of elastic disks in lieu of the rigid parts constituting such machines now on the market are, first, my gin never "chokes" or becomes clogged with a matted tangle of crushed and torn seed and fiber, necessitating a cessation of operations to remove the obstructing mass; second, the angle formed by the meeting circumferences of the disks is too large to catch and cut the seed, while allowing their approach near enough to enable the shortest lint to be seized and held positively while being constantly drawn from the seed, and, third, the simplicity of form, cheapness, readiness with which the parts may be assembled, removed for repairs, or replaced by new pieces.

In the accompanying drawings, wherein like letters represent like parts in the different views, Figure 1 is a front elevation of the gin. Fig. 2 is a top plan of the ribs, showing the parallel shafts upon which the two series of disks are fixed. Fig. 3 is a cross-section upon the line *s s* of Fig. 2, and Fig. 4 is a cross-section upon the line *x x* of Fig. 1.

Referring to Figs. 1 and 4, A is the frame supporting the various parts and affording bearings in which the shafts are journaled. The two disk-bearing shafts are represented by the letters B for the upper and C for the lower in all the figures. Of these two shafts, B is journaled in the frame A at a higher level and is located nearer the rear of the gin than the shaft C. The plane in which the axes of the two said shafts lie would be, therefore, oblique to the plane of the base of the machine.

As ordinarily constructed the pulleys to receive the driving power are placed upon opposite sides of the machine, giving one of such pulleys to each of the two disk-bearing shafts. Any convenient or expedient method of operating these shafts may be used, however, within the scope of my invention. As the gin is ordinarily constructed, a second pulley *g* is attached to the upper shaft B within the frame in such a position that it may be belted to a pulley *h* fast upon and serving motion to a third shaft *f* also journaled in the frame A. The shaft *f* is parallel with the two shafts B and C and occupies the lowest position of the three as well as being situated nearest to the front of the gin. The frame A is bolted to the cross-beams G, which rest upon the gin-house floor, while still other cross-beams preserve the rigidity of the main frame of the machine.

The principal shafts B and C are similar in construction. In the vicinity of one extremity of each a close-fitting collar is made fast. An elastic disk, usually of thin steel, provided with a hole through its center just large enough to readily admit the shaft encircles the same and rests against the collar mentioned. A sleeve fitting the shaft is then slipped down against the exposed side of the disk. A second disk in all respects similar to the first is now placed upon the shaft and held in position by another sleeve of the same construction as the first. A third disk and sleeve follow upon the shaft and others continue in like order until the required series is complete. The length of the sleeves governs the spaces between the disks. The whole is pressed firmly together and so held by means of a divisible nut or collar possessing an interior screw-thread and being brought together upon and engaging a threaded section of the shaft. The details described immediately above are best shown in Figs. 2 and 3.

The similar shafts B and C bearing like driving-pulleys at their ends and identical series of disks and collars, are journaled in the frame A in the boxes $n$ $n$ and $m$ $m$, the first shaft above and slightly to the rear of the position of the second. The distance in a straight line between the axes of the shafts B and C, when in bearings, is something less than the radii of two disks, not upon the same shaft, added together, and were it not for the flexible character of the material of which they are composed the disks would interfere and prevent the desired assembling of the parts. As it is, every disk is sprung slightly aside from the direct line and passes its neighbor upon the other shaft with the result that their elasticity maintains each disk in yielding-pressure contact with one upon the opposite shaft, and that this area of contact remains the same while the disks rotate.

Best shown in Figs. 1 and 2, F is a rectangular frame, commonly bolted together at the corners, of suitable size and crossed by a number of ribs or slats to be hereinafter described. The frame F inclines to the vertical substantially parallel with the plane of the axes of the shafts B and C, Fig. 4, and is capable of being raised and lowered within the guides $i$ $b$, attached to the frame of the machine, Figs. 1 and 4. The ribs mentioned are of such number and arrangement as to include in the space between each couple one pair of the meeting disks. A rib is therefore located outside each end pair of disks in contact. The ribs are of the same length usually, and each possesses the same downward bend near the middle, as shown in Figs. 3 and 4. In the position of the frame F, as shown in the drawings, it will be noticed that the lowest points in the bends of the ribs fall immediately beside the outer portions of the areas of the disks in contact and that the edges of the disks project for a short distance beyond the ribs through the spaces between the latter, Figs. 3 and 4. The clearance between ribs and disks is so regulated as to prevent the passage of the seed of the cotton. As stated above, the frame F bearing the ribs is adapted to reciprocate in the guides $i$ and $b$ attached to the main frame A.

The alternating motion given to the frame F is brought about by eccentrics fixed upon the lowest and most advanced shaft $f$, the said eccentrics being pivotally linked to the lower corners of frame F, as shown in Figs. 1 and 4. The shaft $f$ receives power from the topmost shaft B, as the gin is ordinarily built, by means of belt-connected pulleys $g$ and $h$, their relative diameters being governed by the rate of rotation desired to be given to the shaft $f$, and consequent movement of the frame F. The size of the elements and the manner in which power is applied to the gin may obviously be varied within the scope of my invention.

The operation proceeds as follows: The disks $c$ and $d$ and their motor-shafts rotate toward each other. The cotton-box J is loaded with seed-cotton which is pressed forward into the bends of the ribs. Guided by the rotating disks the staple is directed into and grasped by the contact areas; the seed cannot follow and the shaking of the frame F going on at the same time aids the ginning process. As the disks are intentionally smooth little or no cotton fiber becomes attached thereto, and after being carried free of the contact area descends upon the inclined platform H at the rear of the machine, assisted in this proper course by the centrifugal tendency impressed upon the fibers while held by the rotating disks.

Having thus described my invention, what I claim is—

1. In a cotton gin, the shafts suitably journaled and adapted to receive power from an external source, said shafts being provided with fixed, elastic disks having portions of their sides in contact, substantially as and for the purposes shown and described.

2. In a cotton gin, parallel shafts suitably journaled and adapted to receive power from an external source, each shaft provided with a series of fixed, elastic disks, the said shafts being separated by a distance less than the sum of the radii of any two disks not upon the same shaft, each disk having a portion of its side in contact with a disk upon the opposite shaft, and means whereby seed cotton may be served to the said disks, the whole substantially as and for the purposes shown and described.

3. In a cotton gin, parallel shafts suitably journaled and adapted to receive power from an external source, each shaft provided with a series of fixed, elastic disks, each disk having a portion of its side in contact with a disk upon the shaft opposite, every disk being sprung out of its normal plane at and near the position of the areas in contact whereby the elasticity of the disks maintains the contact between them, substantially as and for the purposes shown and described.

4. In a cotton gin, parallel shafts suitably journaled and adapted to receive power from an external source, each shaft provided with a series of fixed, elastic disks, each disk having a portion of its side in contact with a disk upon the shaft opposite, every disk being sprung out of its normal plane at and near the position of the areas in contact whereby the elasticity of the disks maintains the contact between them, in combination with a table having a number of slots, a portion of the edges of each pair of disks projecting through one of the said slots, substantially as and for the purposes shown and described.

5. In a cotton gin, parallel shafts suitably journaled in a supporting frame and adapted to receive power from an external source, each shaft provided with a series of fixed, elastic disks, each disk having a portion of its side in contact with a disk upon the shaft opposite, every disk being sprung out of its normal plane at and near the position of the areas in contact whereby the elasticity of the disks maintains the contact between them, in combination with a table having a number of slots, a portion of the edges of each pair of disks projecting through one of the said slots, the said table being movable in guides attached to the supporting frame, the additional power driven shaft journaled in the supporting frame and mechanism for imparting reciprocating motion to the said table, the whole substantially as and for the purposes shown and described.

6. In a cotton gin, parallel shafts suitably journaled in a supporting frame and adapted to receive power from an external source, each shaft provided with a series of fixed, elastic disks, each disk having a portion of its side in contact with a disk upon the shaft opposite, every disk being sprung out of its normal plane at and near the position of the areas in contact whereby the elasticity of the disks maintains the contact between them, in combination with a frame, F, possessing the ribs, $a$, having their middle portions depressed, the said frame, F, movable within guides attached to the frame of the gin, the additional shaft, $f$, the belt connected pulleys, $g$ and $h$, the eccentrics, $e\ e$, for imparting reciprocating motion to the frame, F, the cotton box, J, and the receiving platform, H, the whole constructed and arranged substantially as and for the purposes shown and described.

In testimony whereof I affix my signature in presence of two witnesses.

MILLARD MILTON PEARSON.

Witnesses.
JAMES M. HUMPHRIES,
EDWARD C. HARTIGAN.